US010774542B2

(12) United States Patent
Vogt et al.

(10) Patent No.: US 10,774,542 B2
(45) Date of Patent: *Sep. 15, 2020

(54) FLOORING SYSTEM

(71) Applicant: Milliken & Company, Spartanburg, SC (US)

(72) Inventors: Kirkland W. Vogt, Simpsonville, SC (US); Dale S. Kitchen, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,107

(22) Filed: Nov. 20, 2018

(65) Prior Publication Data

US 2019/0211570 A1  Jul. 11, 2019

Related U.S. Application Data

(60) Provisional application No. 62/615,080, filed on Jan. 9, 2018.

(51) Int. Cl.
*B23B 7/12* (2006.01)
*E04F 15/10* (2006.01)
(Continued)

(52) U.S. Cl.
CPC ............ *E04F 15/107* (2013.01); *B32B 5/022* (2013.01); *B32B 5/245* (2013.01); *B32B 5/26* (2013.01);
(Continued)

(58) Field of Classification Search
CPC .... B32B 2262/0223; B32B 2266/0278; B32B 2307/748; B32B 2419/04; B32B 2471/00; B32B 2471/02; B32B 27/065; B32B 27/12; B32B 27/30; B32B 27/40; B32B 5/022; B32B 5/245; B32B 5/26; B32B 7/06; B32B 7/08; B32B 7/12; B32B 7/14; E04F 15/02155; E04F 15/107
See application file for complete search history.

(56) References Cited

U.S. PATENT DOCUMENTS 4,454,183 A  6/1984  Wollman .................... 428/92
5,077,870 A  1/1992  Melbye et al. .............. 24/452
(Continued)

FOREIGN PATENT DOCUMENTS

EP       2 258 909       12/2010
WO      WO 98/03104      1/1998

OTHER PUBLICATIONS

Patent Cooperation Treaty PCT International Search Report, dated, Mar. 6, 2019, International Application No. PCT/US2018/064195, Intern'l Date of Filing, Dec. 6, 2018.

*Primary Examiner* — Lawrence D Ferguson
(74) *Attorney, Agent, or Firm* — Brenda D. Wentz

(57) ABSTRACT

This invention relates to a method for adhering floor tiles together and the flooring system thereby created. The method utilizes individual adhesive units as fasteners for attachment of each floor tile to the next contiguous floor tile. The adhesive units are a multi-layered composite comprised of at least one adhesive layer and at least one layer of polymer film or textile substrate. When a series of floor tiles are attached to one another in this manner, a floating floorcovering article is achieved.

19 Claims, 8 Drawing Sheets

(51) Int. Cl.
  *E04F 15/02* (2006.01)
  *B32B 7/12* (2006.01)
  *B32B 5/24* (2006.01)
  *B32B 5/02* (2006.01)
  *B32B 7/08* (2019.01)
  *B32B 7/06* (2019.01)
  *B32B 5/26* (2006.01)
  *B32B 7/14* (2006.01)
  *B32B 27/12* (2006.01)
  *B32B 27/40* (2006.01)
  *B32B 27/30* (2006.01)
  *B32B 27/06* (2006.01)

(52) U.S. Cl.
  CPC .................. *B32B 7/06* (2013.01); *B32B 7/08* (2013.01); *B32B 7/12* (2013.01); *B32B 7/14* (2013.01); *E04F 15/0215* (2013.01); *E04F 15/02155* (2013.01); *B32B 27/065* (2013.01); *B32B 27/12* (2013.01); *B32B 27/30* (2013.01); *B32B 27/40* (2013.01); *B32B 2262/0223* (2013.01); *B32B 2266/0278* (2013.01); *B32B 2307/748* (2013.01); *B32B 2419/04* (2013.01); *B32B 2471/00* (2013.01); *B32B 2471/02* (2013.01); *E04F 2201/07* (2013.01)

(56) References Cited

U.S. PATENT DOCUMENTS

| | | | |
|---|---|---|---|
| 5,602,635 A | 2/1997 | Domoto et al. | 399/328 |
| 5,845,735 A | 12/1998 | Muller et al. | 180/322 |
| 7,182,989 B2 * | 2/2007 | Higgins | A47G 27/0293 |
| | | | 428/51 |
| 7,188,396 B2 | 3/2007 | Melbye et al. | 24/452 |
| 7,678,159 B1 | 3/2010 | Weiner | 8/478 |
| 7,846,214 B1 | 12/2010 | Weiner | 8/478 |
| 2004/0018354 A1 | 1/2004 | May | 428/317.3 |
| 2010/0024329 A1 * | 2/2010 | Gray | A47G 27/0475 |
| | | | 52/220.1 |
| 2011/0107720 A1 | 5/2011 | Oakey et al. | 52/746.1 |
| 2014/0037885 A1 | 2/2014 | Oakey | 428/58 |
| 2014/0137377 A1 | 5/2014 | Cheng | 24/449 |
| 2014/0212618 A1 | 7/2014 | McBride et al. | 428/54 |

* cited by examiner

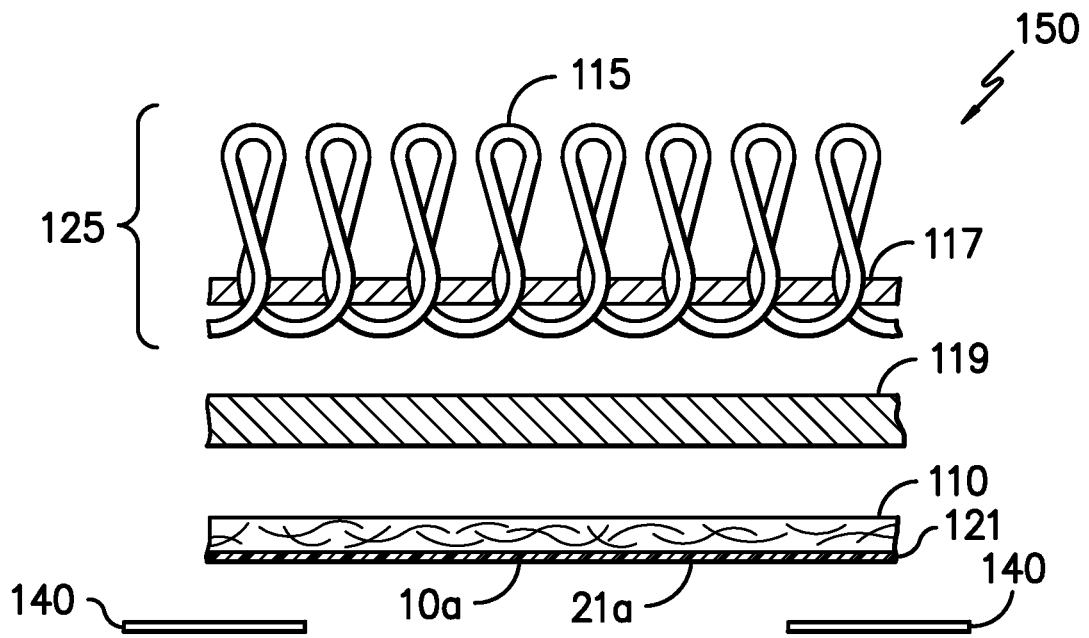
FIG. -1-
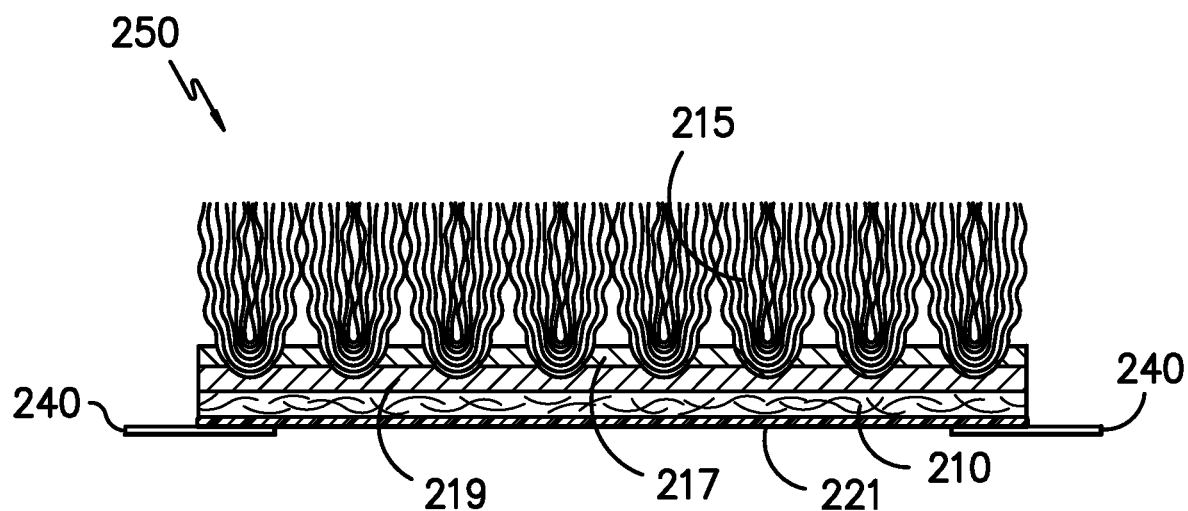
FIG. -2-

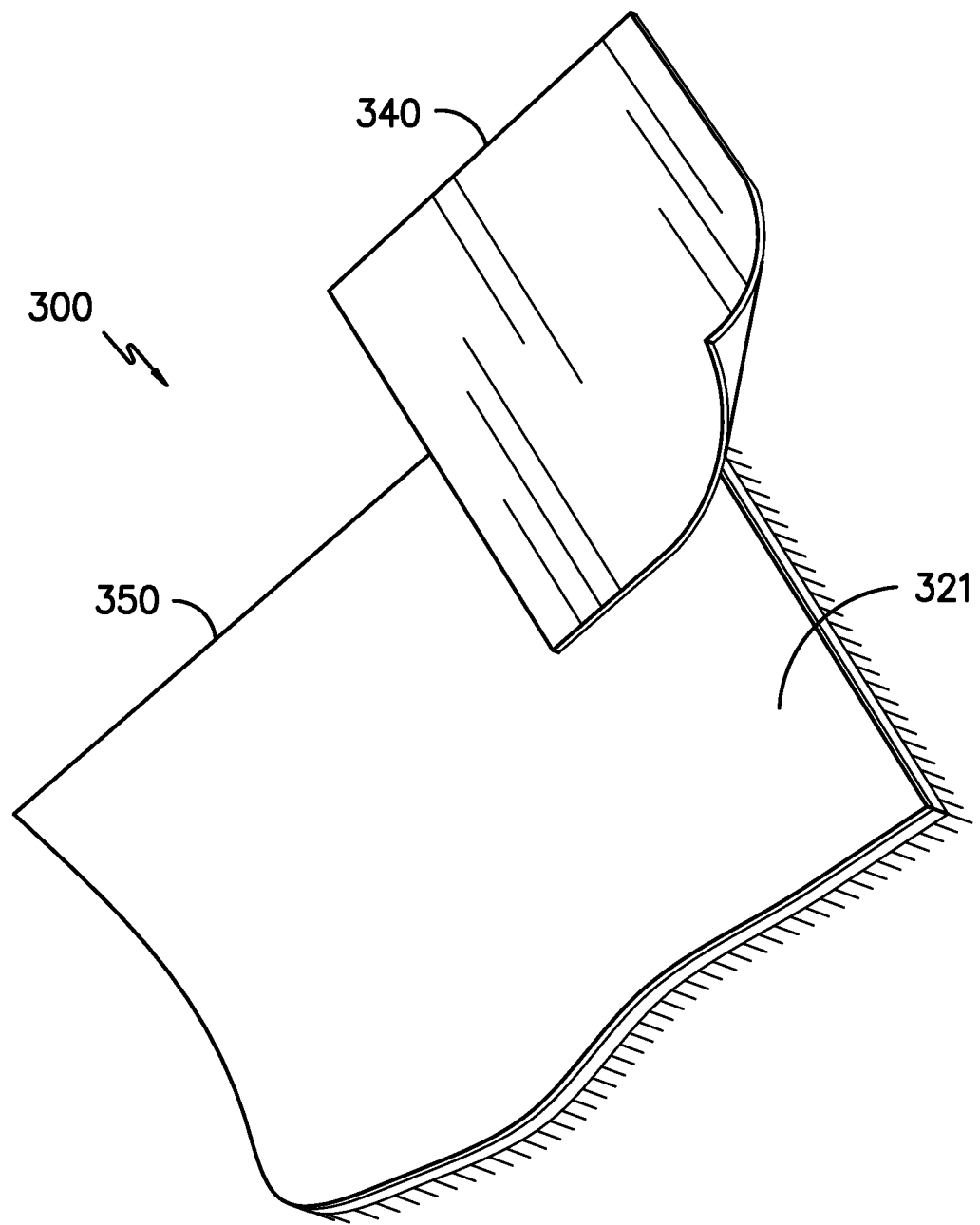
FIG. -3-

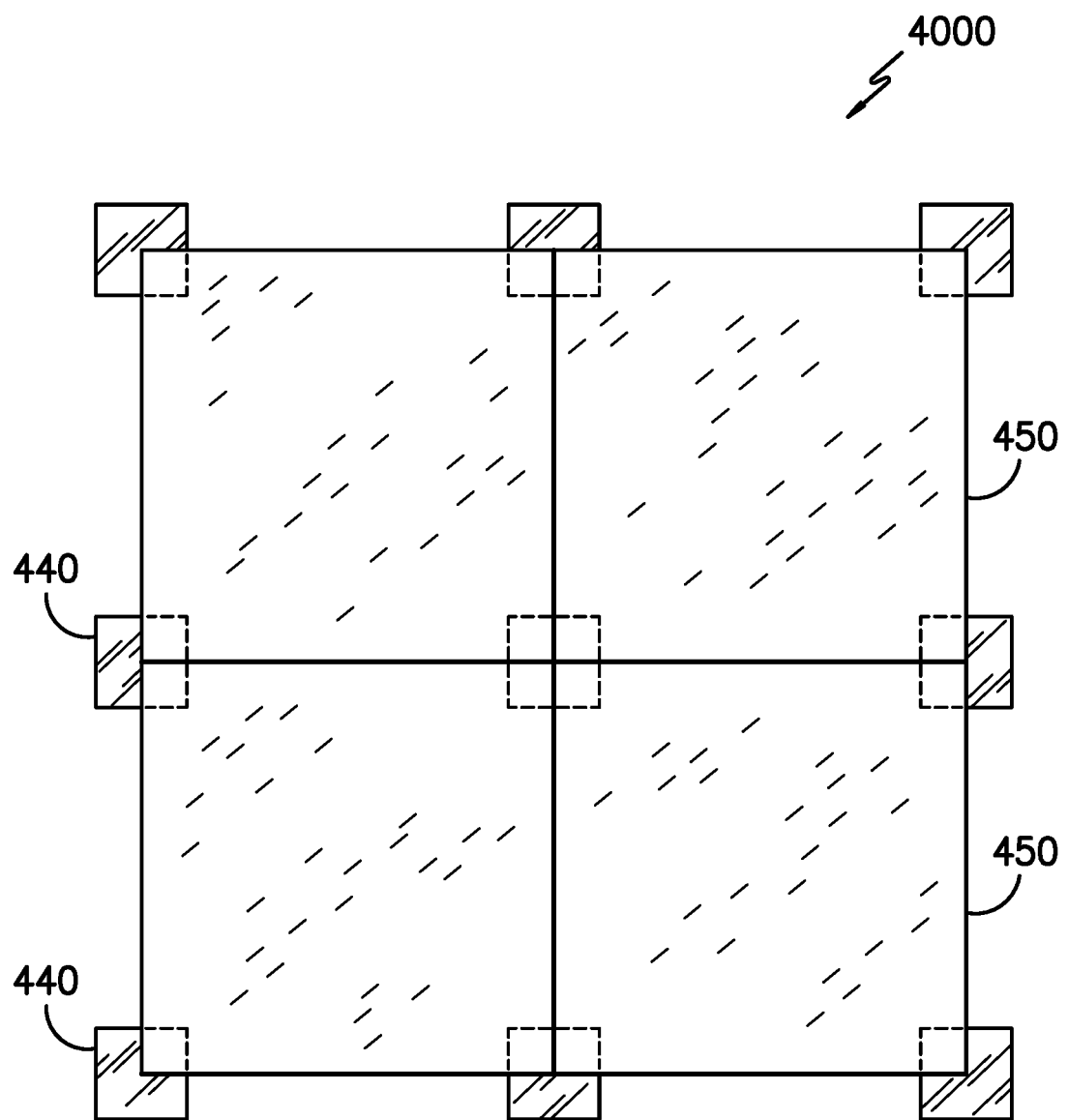
FIG. -4-

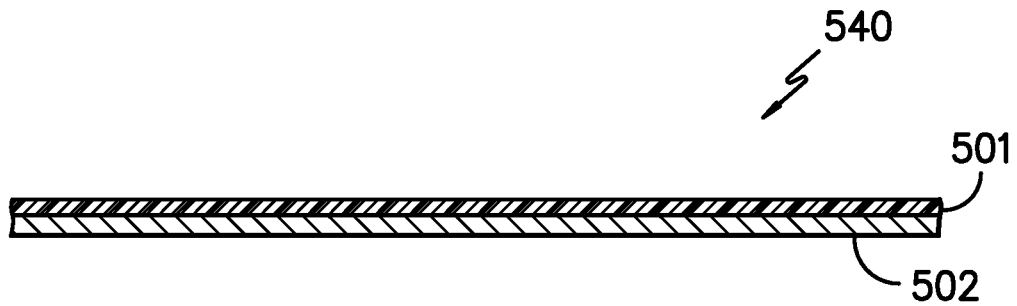
FIG. -5A-
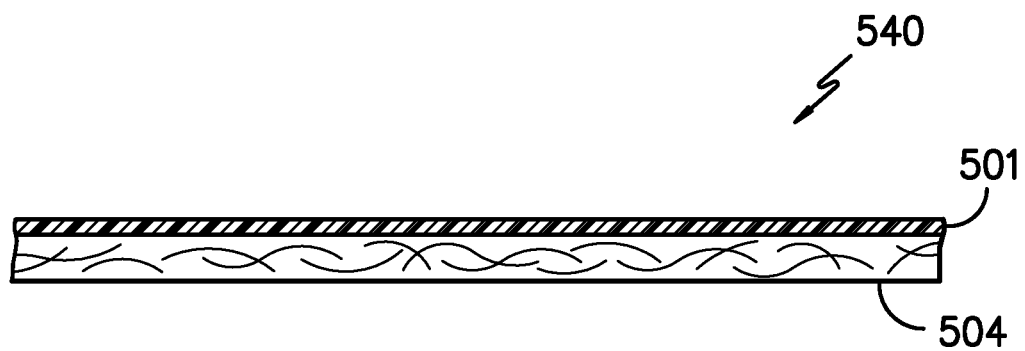
FIG. -5B-
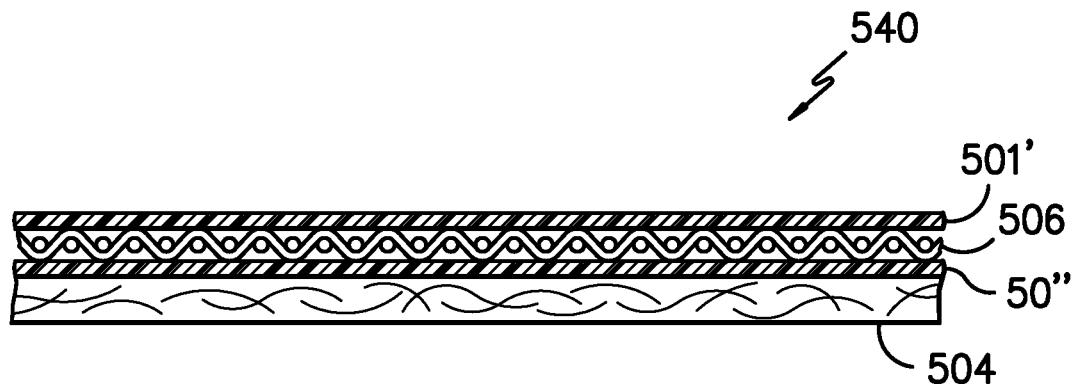
FIG. -5C-

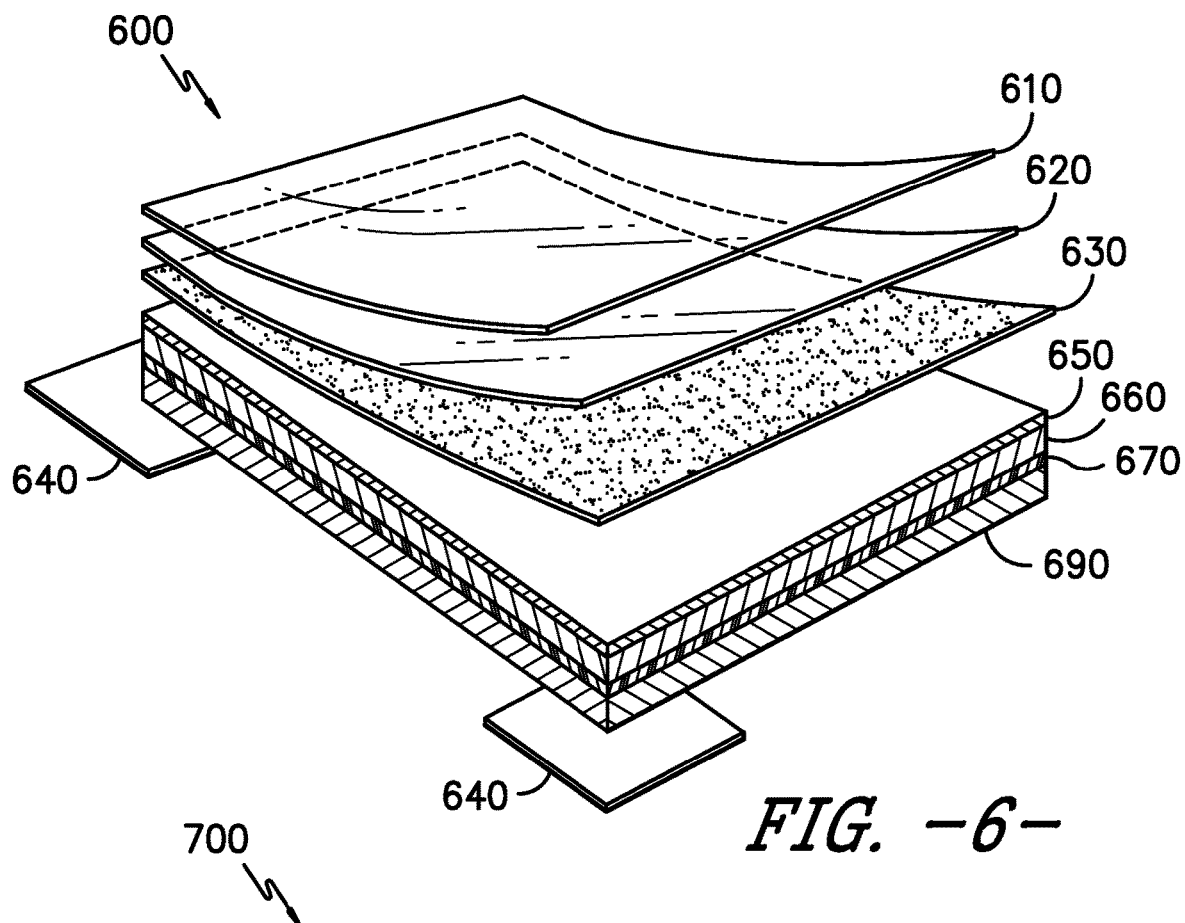
FIG. -6-
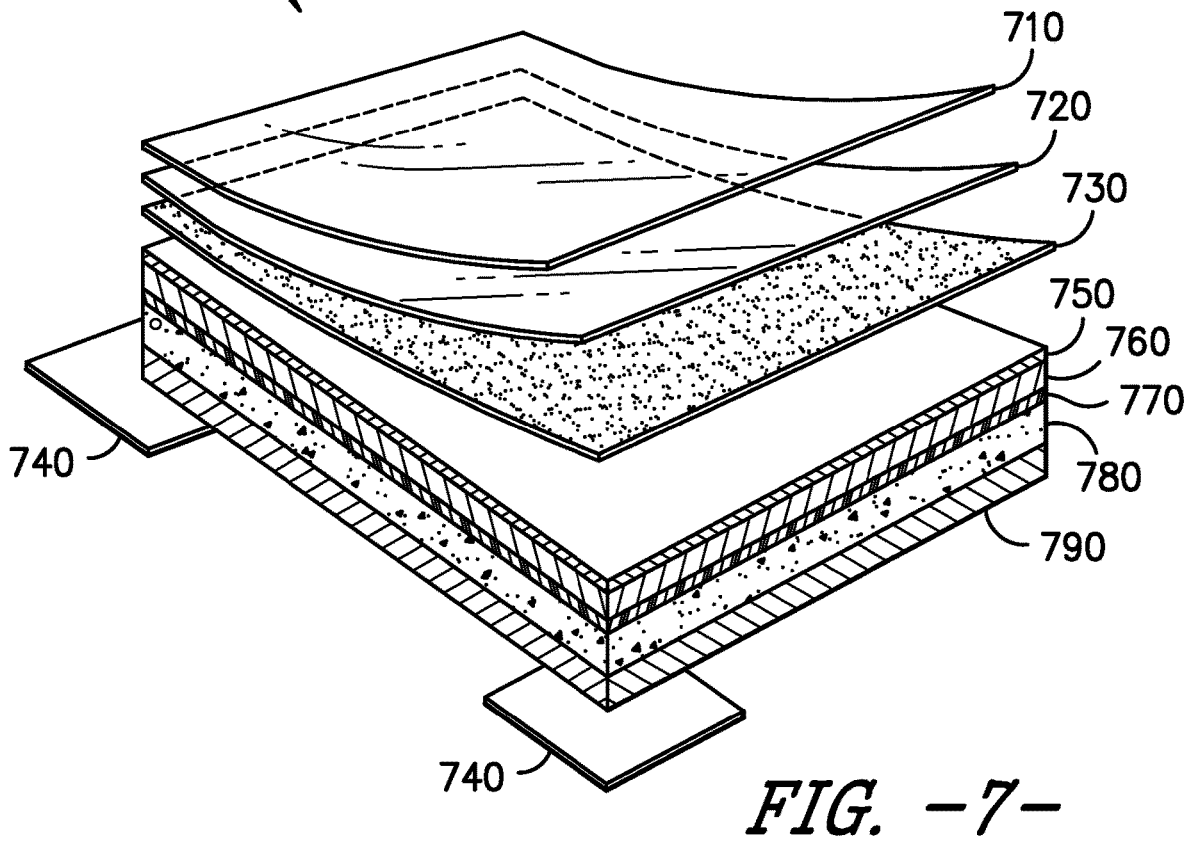
FIG. -7-

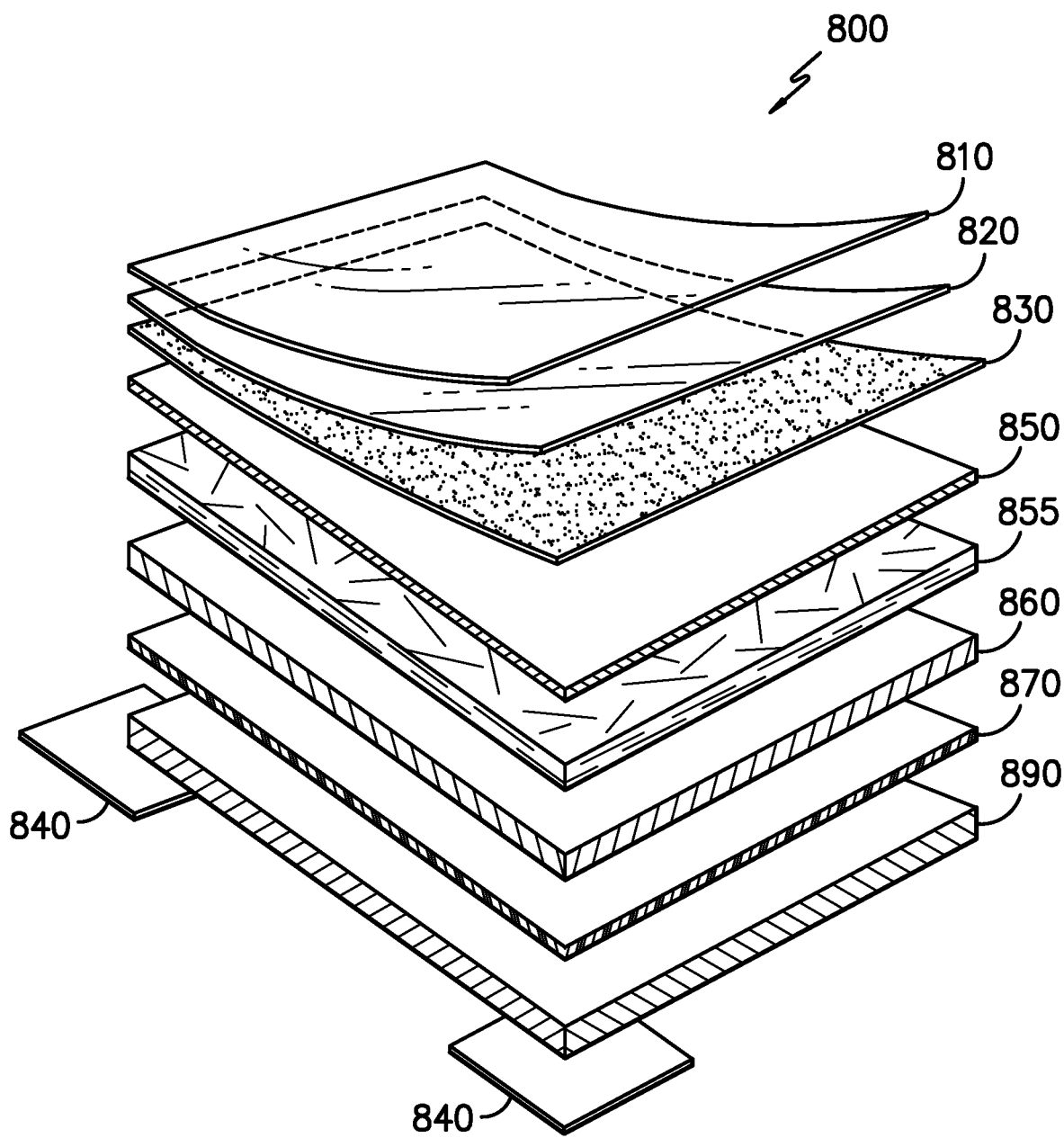
FIG. -8-

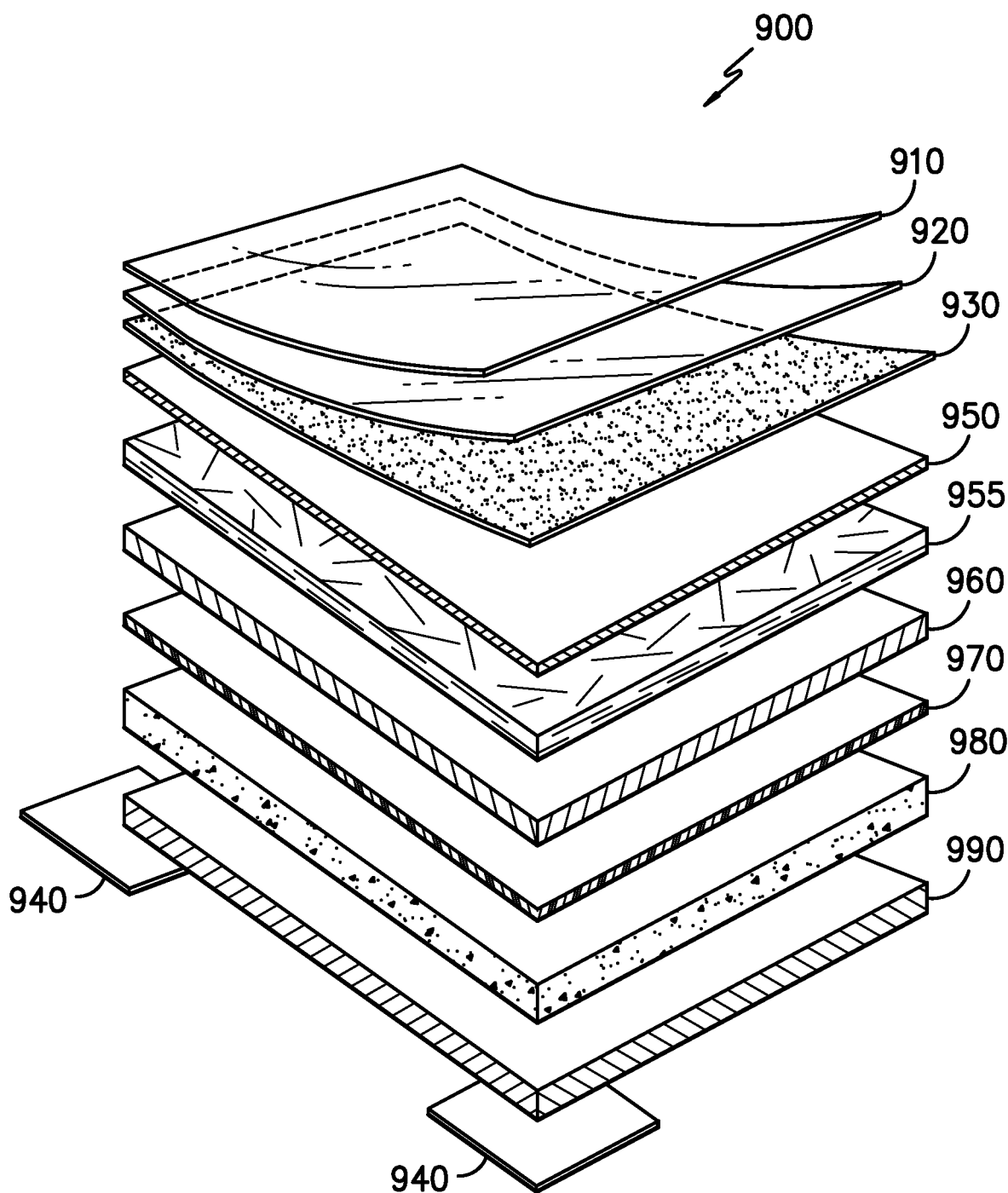
FIG. -9-

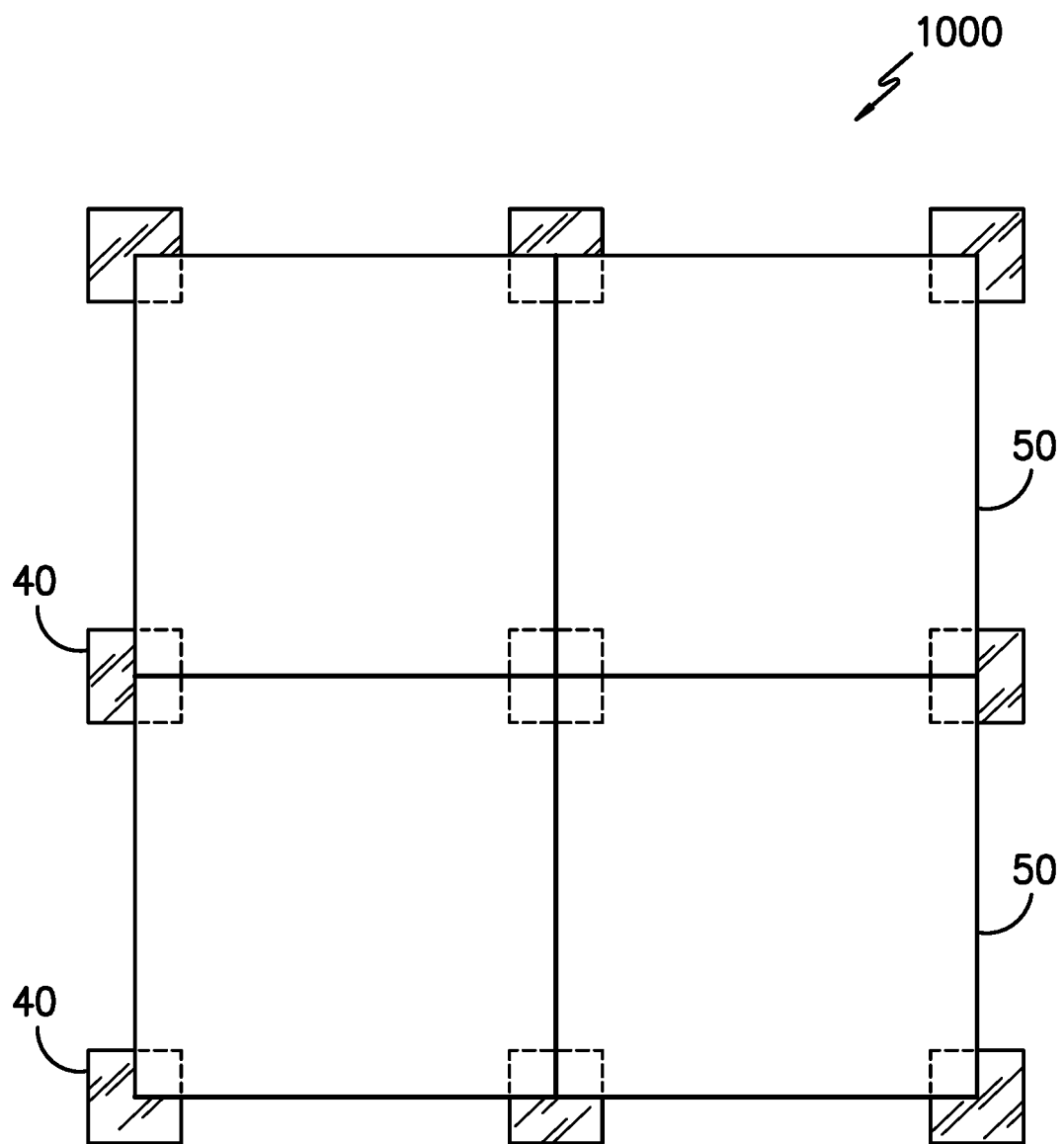
FIG. -10-

FLOORING SYSTEM

CROSS REFERENCE TO RELATED APPLICATIONS

This application claims priority to U.S. Provisional Patent Application No. 62/615,080, entitled "Flooring System," which was filed on Jan. 9, 2018, and is entirely incorporated by reference herein.

TECHNICAL FIELD

This invention relates to a method for adhering floor tiles together and the flooring system thereby created. The method utilizes individual adhesive units as fasteners for attachment of each floor tile to the next contiguous floor tile. The adhesive units are a multi-layered composite comprised of at least one adhesive layer and at least one layer of polymer film or textile substrate. When a series of floor tiles are attached to one another in this manner, a floating floorcovering article is achieved.

BACKGROUND

The present invention relates to a flooring system that utilizes individual adhesive units as fasteners for attaching floor tiles together to create a floating floorcovering article. Individual adhesive units as fasteners provide the ideal solution to the problem of chemical adhesive materials that are harmful to floor surfaces and the environment. Conventional carpet tiles and vinyl floor tiles are often adhered to a flooring surface using these types of chemical adhesive compositions. Chemical adhesive compositions fail to allow the floor tiles any amount of shifting as one unit because they are individually attached to the floor and are typically not attached to one another. In contrast, with the use of individual adhesive units as fasteners, the floor tiles of the present invention are adhered and/or attached to one another rather than to the flooring surface. Thus, the present invention provides a floor tile-to-floor tile (e.g. carpet tile-to-carpet tile) adhesive system for floorcovering articles, while the prior art provided floor tile-to-flooring surface adhesive methods.

Contrary to conventional methods for installing floor tiles (such as carpet tile and/or vinyl tile), it has been discovered that under certain circumstances it is desirable to allow the series of floor tile to move together as if it were a single floorcovering article (such as broadloom carpet, in the case of carpet tiles). It is further advantageous to eliminate the use of traditional adhesive compositions which have historically been used to adhere floor tiles to a flooring surface. Thus, the use of individual adhesive units as fasteners for attaching floor tiles together provides an advantage over the prior art.

BRIEF SUMMARY

In one aspect, the invention relates to a flooring system comprising: (a) a plurality of floor tiles, wherein the plurality of floor tiles contains individual floor tiles, and wherein the individual floor tiles are comprised of: (i) a first wear layer (125), (ii) a second layer (119), and (iii) a third layer (110) having a shear resistant surface thereon (121); and (b) at least one adhesive fastener (140) containing an adhesive material; wherein at least a portion of the adhesive fastener (140) is attached to at least a portion of the shear resistant surface (121) of the individual floor tiles to form a plurality of floor tiles interconnected to one another via the at least one adhesive fastener.

In another aspect, the invention relates to a flooring system comprising: (a) a plurality of floor tiles, wherein the plurality of floor tiles contains individual floor tiles, and wherein the individual floor tiles are comprised of: (i) a first wear layer (125), (ii) a second layer (119), and (iii) a third layer (110) having an adhesive layer thereon (121); and (b) at least one adhesive fastener (140) containing an adhesive material; wherein at least a portion of the adhesive fastener (140) is attached to at least a portion of the adhesive layer (121) of the individual floor tiles to form a plurality of floor tiles interconnected to one another via the at least one adhesive fastener.

In a further aspect, the invention relates to a flooring system comprising: (a) a plurality of floor tiles, wherein the plurality of floor tiles contains individual floor tiles, and wherein the individual floor tiles are comprised of: (i) a first wear layer (125), (ii) a second layer (119), and (iii) a third layer (110) comprised of a textile substrate or a multi-component laminate; and (b) at least one adhesive fastener (140) containing an adhesive material; wherein at least a portion of the adhesive fastener (140) is attached to at least a portion of the third layer (110) or multi-component laminate of the individual floor tiles to form a plurality of floor tiles interconnected to one another via the at least one adhesive fastener.

In yet another aspect, the invention relates to a flooring system for carpet tile comprising: (a) a plurality of carpet tiles, wherein the plurality of carpet tiles contains individual carpet tiles, and wherein the individual carpet tiles are comprised of: (i) a first layer of tufted pile carpet, (ii) a second layer of back coating, and (iii) a third layer of textile substrate; and (b) at least one adhesive fastener; wherein at least a portion of the adhesive fastener is attached to at least a portion of the third layer of textile substrate of the individual carpet tiles to form a plurality of carpet tiles interconnected to one another via the at least one adhesive fastener.

In another aspect, the invention relates to a flooring system comprising: (a) a plurality of floor tiles, wherein the plurality of floor tiles contains individual floor tiles, and wherein the individual floor tiles are comprised of: (i) a first wear layer, (ii) a second layer of back coating, and (iii) a third layer of textile substrate having an adhesive coating thereon; and (b) at least one adhesive fastener containing an adhesive material, wherein the adhesive fastener may be comprised of the same or different adhesive material as the third layer of textile substrate; wherein at least a portion of the adhesive fastener is attached to at least a portion of the textile substrate of the individual floor tiles to form a plurality of floor tiles interconnected to one another via the at least one adhesive fastener.

BRIEF DESCRIPTION OF THE DRAWINGS

FIG. 1 is an expanded side view of one embodiment of a carpet tile with individual adhesive units as fasteners.

FIG. 2 is a side view of another embodiment of a carpet tile with individual adhesive units as fasteners.

FIG. 3 is a schematic drawing illustrating the placement of an individual adhesive unit as a fastener on one corner of the intended floor facing surface of a carpet tile.

FIG. 4 is a schematic drawing illustrating one embodiment of a series of carpet tiles attached to one another with individual adhesive units as fasteners.

FIG. 5A is an expanded side view of one embodiment of the multi-layered adhesive unit.

FIG. 5B is an expanded side view of another embodiment of the multi-layered adhesive unit.

FIG. 5C is an expanded side view of yet a further embodiment of the multi-layered adhesive unit.

FIG. 6 is an expanded side view of one embodiment of a vinyl-containing floor tile with individual adhesive units as fasteners.

FIG. 7 is an expanded side view of another embodiment of a vinyl-containing floor tile with individual adhesive units as fasteners.

FIG. 8 is an expanded side view of yet a further embodiment of a vinyl-containing floor tile with individual adhesive units as fasteners.

FIG. 9 is an expanded side view of another embodiment of a vinyl-containing floor tile with individual adhesive units as fasteners.

FIG. 10 is a schematic drawing illustrating one embodiment of a series of vinyl-containing floor tiles attached to one another with individual adhesive units as fasteners.

DETAILED DESCRIPTION

The present invention described herein is an adhesive system for floor tile. As used herein, "floor tile" includes, without limitation, carpet tile, vinyl tile, luxury vinyl tile, and the like. The adhesive system employs individual adhesive units as fasteners for attaching floor tiles to one another. Attaching floor tiles together in this manner provides a floating floorcovering article. The term "floating floorcovering article," as used herein, is intended to refer to an article that is not attached or adhered to the surface of the floor, and instead, actually allows some amount of movement (e.g. shifting and/or expanding due to temperature changes) of the floorcovering article.

The term "thermoplastic" is used herein in its conventional sense to mean a resin having the property of softening or fusing when heated and of hardening again when cooled. Thermoplastic materials suitable for use herein are selected from the group consisting of polyolefin polymers (such as polyethylene, linear low density polyethylene, polypropylene, polybutylene and copolymers made from ethylene, propylene and/or butylene), polyvinyl chloride (including high density polyvinyl chloride), polyvinylidene chloride, cellulosic resins (such as cellulose acetate, cellulose acetate butyrate and cellulose acetate propionate), acrylic resins (such as polymethyl methacrylate, styrene acrylonitrile, polystyrene, polycarbonate and acrylonitrile-butadiene-styrene), polyamides (such as nylon 6 and nylon 6,6), polyesters (such as polyethylene terephthalate, glycol modified polyethylene terephthalate and polybutylene terephthalate), and the like, and combinations thereof.

The term "adhesive" as used herein refers to any mechanical and/or chemical means used to create a lateral, frictional, and/or peel force between at least two opposing surfaces.

Adhesive materials of the present invention include mechanical fasteners (such as, for example, mushroom-type fasteners, hooks, pins, and the like, which are further herein described), chemical adhesives (such as pressure-sensitive adhesives), and combinations thereof. When mechanical fasteners are used as the adhesive material, the surface to which they are attached may be characterized as a mechanically modified surface. The surface with mechanical fasteners thus created is a shear resistant surface which is a mechanically modified surface. When chemical adhesives are used as the adhesive material, the surface to which they are applied may be characterized as a chemically modified surface. The surface with chemical adhesives thus created is a shear resistant surface which is a chemically modified surface.

Pressure-sensitive adhesives (or "PSAs") are generally classified into two main classes: 100% solids and less than 100% solids. A 100% solids refers to the amount of non-solvent content in an adhesive by weight. These adhesive materials are further characterized as being polymeric adhesive materials. In the class of 100% solids, adhesive materials may be further characterized as plastisol, thermoplastic, or thermoset. Thermoplastic adhesives are also known as hot-melt adhesives. In the class of less than 100% solids, adhesive materials may be further characterized as solvent borne-solution or water-borne emulsion (also referred to as water-borne latex). Within each of these further characterizations, adhesive materials may be described as being either a permanent adhesive or a removeable/repositionable adhesive. As used herein, a "permanent" adhesive is an adhesive designed to stick to a substrate (also known as the adherent) without edge lifting and that cannot be removed without damaging either the adhesive material itself or the substrate to which it has been adhered. A "removeable" adhesive is an adhesive designed to stick to a substrate without edge lifting and that can be removed without damaging either the adhesive material itself or the substrate to which it has been adhered. In addition, "permanent" or "removeable/repositionable" can be determined by how the layers of material which are adhered together with an adhesive material fracture during stress (also known as "adhesive failure mode"). For example, under stress, permanent adhesives are typically designed to fracture in the adherent itself and not in the interface of adhesive material and adherent. In contrast, repositionable adhesives are typically designed to fracture under stress in the interface of the adhesive material and the adherent. Additional information regarding adhesive materials as described herein may be found at https://label.averydennison.asia/content/dam/averydennison/lpm/na/en/doc/home/resource%20 center/Adhesive %20Overview(1).pdf, which is entirely incorporated by reference herein. Also, adhesive materials useful in the present invention are described in *Pressure-Sensitive Design and Formulation, Application* by Istvan Benedek (Koninklijke Brill N V, Leiden, The Netherlands, Vol. 2, 2006), which book is entirely incorporated by reference herein. Information regarding adhesives under stress (e.g. adhesive failure modes) can be found at http://www.nhml.com/adhesion-failure-modes, which is entirely incorporated by reference herein.

The floor tiles are attached to one another by individual adhesive units as fasteners. The adhesive units may be provided in pre-cut shapes (e.g. squares, rectangles, circles, or any suitable geometric shape). Alternatively, the adhesive units may be provided in roll form thereby allowing the end-use consumer to determine the size of the adhesive unit desired for installation of the floor tiles. The size of the adhesive units will generally be determined based on the size of the floor tiles being attached together. In one aspect of the invention, the adhesive unit covers from 1% to 99% of the intended floor facing surface of a single floor tile. In another aspect of the invention, the adhesive unit covers from 5% to 80%, from 5% to 70%, from 5% to 60%, or even from 5% to 50% of the intended floor facing surface of a single floor tile. In a further aspect of the invention, the adhesive unit covers at least a portion of the floor facing surface of a floor tile. In another aspect of the invention, the adhesive unit covers a minority portion of the intended floor facing surface of a single floor tile.

With regard to placement of the individual adhesive unit on the intended floor facing surface of the floor tile, it should be noted that it is not necessary for the entire surface of the floor tile to be covered with the adhesive unit as fastener. Rather, for economy of manufacture and to balance the requirements of stabilizing the floor tiles without making it overly difficult to remove one or more tiles for cleaning or replacement, the individual adhesive units as a fastener system may be spaced apart in discrete areas, for example spaced around the edges or corners of the floor tile.

In one aspect of the invention, the individual adhesive unit(s) may be placed on at least one edge of a first floor tile in such a way that it includes an amount of overhang for attachment to a second floor tile. Attachment occurs via the overhang portion of the adhesive unit. The amount of surface overhang will vary depending on human variation that occurs naturally. However, it may be ideal that the overhang portion of the adhesive unit from an edge of the floor tile is in the range from 5% to 95%, from 10% to 80%, from 20% to 70%, or even from 30% to 60%. The overhang portion of the adhesive unit from an edge of the floor tile may be approximately 50%.

In another aspect of the invention, the individual adhesive unit may be placed on at least one corner of a first floor tile in such a way that it includes an amount of overhang for attachment to a second floor tile. Attachment occurs via the overhang portion of the adhesive unit. The amount of surface overhang will vary depending on human variation that occurs naturally. However, it may be ideal that the overhang portion of the adhesive unit from a corner of the floor tile is in the range from 5% to 95%, from 10% to 90%, from 20% to 90%, from 30% to 90%, from 40% to 90%, or even from 50% to 90%. The overhang portion of the adhesive unit from a corner of the floor tile may be approximately 75%.

The adhesive unit may include at least one polymer film. Suitable polymer materials include, for example, polyester (including aromatic polyesters, such as polyethylene terephthalate, polybutylene terephthalate, polytrimethylene terephthalate, and polytriphenylene terephthalate, and aliphatic polyesters, such as polylactic acid), acrylic, polyamide (such as nylon 6; nylon 6, 6; nylon 1, 1; and nylon 6, 10), polyolefin (such as polypropylene and polyethylene), polyaramid (including poly-p-phenyleneteraphthalamid and poly-m-phenyleneteraphthalamid), polyurethane, regenerated cellulose (such as rayon), and combinations thereof. The term "polyamide" is intended to describe any long-chain polymer having recurring amide groups as an integral part of the polymer chain. The term "polyester" is intended to describe any long-chain polymer having recurring ester groups.

The adhesive unit may also include at least one textile substrate. Suitable materials comprising the textile substrate include, for example, polyester (including aromatic polyesters, such as polyethylene terephthalate, polybutylene terephthalate, polytrimethylene terephthalate, and polytriphenylene terephthalate, and aliphatic polyesters, such as polylactic acid), acrylic, polyamide (such as nylon 6; nylon 6, 6; nylon 1, 1; and nylon 6, 10), polyolefin (such as polypropylene and polyethylene), polyaramid (including poly-p-phenyleneteraphthalamid and poly-m-phenyleneteraphthalamid), polyurethane, regenerated cellulose (such as rayon), and combinations thereof. The term "polyamide" is intended to describe any long-chain polymer having recurring amide groups as an integral part of the polymer chain. The term "polyester" is intended to describe any long-chain polymer having recurring ester groups. In one aspect of the invention, the textile substrate may be a melt-spun nonwoven fabric. Additional information regarding any of the nonwoven textile substrates of the present invention may be found in *Nonwoven Fabrics: Raw Materials, Manufacture, Applications, Characteristics, Testing Processes* edited by Wilhelm Albrecht, Hilmar Fuchs and Walter Kittelmann (2003, Wiley-VCH Verlag Gmbh & Co. KGaA), which book is entirely incorporated by reference herein.

Individual adhesive units as fasteners suitable for use in the present invention allow the floor tiles to be easily disconnected and/or unattached from one another. For example, if a carpet tile or vinyl tile becomes damaged or otherwise no longer aesthetically pleasing it can be manually removed by simply pulling the tile up until it is released from the adhesive unit(s). A new carpet tile or vinyl tile can then be installed in its place by using light pressure to attach it to the existing adhesive unit(s). Thus, the invention described herein for attaching floor tiles to one another may be characterized as being a releasably attachable adhesive system for floor tiles. Commercially available adhesive-type products include FlexLok® from Mohawk Group, TacTiles® and GlasBac® from Interface, Inc., and TileTabs® Nexus® Tile Connectors from J+J Flooring Group.

Turning to the Figures, FIG. 1 illustrates carpet tile 150 comprised of tufted pile carpet 125. Tufted pile carpet 125 is comprised of primary backing layer 117 and face yarns 115. The primary backing layer 117 is typically included in the tufted pile carpet to give stability to the face yarns. The materials comprising face yarns 115 and primary backing layer 117 may independently be selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The material comprising face yarns 115 and primary backing layer 117 may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising face yarns 115 and primary backing layer 117 will generally be independently comprised of interlaced fibers, interlaced yarns, loops, or combinations thereof.

The material comprising face yarns 115 and primary backing layer 117 may also be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Furthermore, the material comprising face yarns 115 and primary backing layer 117 may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, face yarns 115 and primary backing layer 117 may include additives coextruded therein, may be precoated with any number of different materials, including those listed in greater detail below, and/or may be dyed or colored to provide other aesthetic features for the end user with any type of colorant, such as, for example, poly (oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

The face yarns 115 may be dyed or undyed. If the face yarns 115 are dyed, they may be solution dyed. The weight of the face yarn, pile height, and density will vary depending on the desired aesthetics and performance requirements of the end-use carpet tile. In FIG. 1, face yarns 115 are illustrated in a loop pile construction. In FIG. 2, carpet tile 250 is shown with face yarns 215 in a cut pile construction. Of course, it is to be understood that face yarn constructions including combinations of loop pile and cut pile may likewise be used.

The primary backing layer 117 can be any suitable primary backing material. The primary backing layer 117 may be comprised of a woven, nonwoven or knitted material, or combinations thereof. The general purpose of primary backing layer 117 is to support the tufts of face yarns 115. In one aspect, primary backing layer 117 is a nonwoven polyester spunbond material. One commercially available example of the polyester spunbond material is Lutradur® from Freudenberg Nonwovens of Weinheim, Germany. In another aspect, flat woven polyester tapes, such as Isis™ from Propex of Chattanooga, Tenn., may be utilized. Also, Colback® nonwoven backing material may also be suitable for use. If needed, a primary backing layer made of a woven tape with either staple fibers or nonwoven fabrics affixed can be used. Primary backing layer 117 may also be a needle punched nonwoven material. Also, stitch bonded and knitted polyester fabrics may be used.

The tufted pile carpet 125 that includes face yarns tufted into a primary backing layer may be heat stabilized to prevent dimensional changes from occurring in the finished carpet tile. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted pile carpet may also be stabilized to allow for the yarn and primary backing to shrink prior to completion of the carpet tile manufacturing process. Tufted pile carpet 125 is typically considered the wear layer of a floorcovering article such as a carpet tile. While tufted pile carpet has been shown herein as an exemplary wear layer for floorcovering articles, it should be noted that other known wear layers for floorcovering articles are contemplated to be within the scope of the present invention. These other wear layers include, for instance, non-tufted carpet yarn constructions (e.g. woven, knit, non-woven constructions) and film and laminate layers used in vinyl tile, luxury vinyl tile, and wood flooring constructions. Laminate layers are typically multi-component. The multi-component laminate includes layers selected from the group consisting of textile substrate, foam, film, and combinations thereof.

As further shown in FIG. 1, secondary backing layer 119 is provided as a back coating to tufted pile carpet 125. The back coating typically provides a moisture barrier and additional dimensional stability to the carpet tile. Secondary backing layer 119 may be comprised of any combination of synthetic and/or natural materials typically used as secondary backing layers in carpet manufacturing Nonlimiting examples of materials comprising the secondary backing layer include materials that contain polyurethane, polyolefin, bitumen, polyvinyl chloride, and the like, and combinations thereof. Exemplary coating techniques for applying the back coating to the tufted pile carpet include, without limitation, knife coating, pad coating, paint coating, spray application, roll-on-roll methods, troweling methods, extrusion coating, foam coating, pattern coating, print coating, lamination, and the like, and mixtures thereof. Secondary backing layer 119 may also be heat stabilized to prevent dimensional changes from occurring in the finished carpet tile as herein previously described.

Carpet tile 150 further optionally includes tertiary backing layer 110. Tertiary backing layer 110 contains floor facing surface 10a. Typically, tertiary backing layer 110 is a textile substrate. Textile substrates include materials selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof. In one aspect of the invention, tertiary backing layer 110 is a textile substrate comprised of a thermoplastic material as herein previously described.

The material comprising tertiary backing layer 110 may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising tertiary backing layer 110 will generally be comprised of interlaced fibers, interlaced yarns, loops, or combinations thereof.

The material comprising tertiary backing layer 110 may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Further, the material comprising tertiary backing layer 110 may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, tertiary backing layer 110 may include additives coextruded therein, may be precoated with any number of different materials, including those listed in greater detail below, and/or may be dyed or colored to provide other aesthetic features for the end user with any type of colorant, such as, for example, poly(oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like. The fibers comprising tertiary backing layer 110 may be dyed or undyed. If the fibers are dyed, they may be solution dyed. The weight and density of tertiary backing layer 110 will vary depending on the desired aesthetics and performance requirements of the carpet tile.

Tertiary backing layer 110 may be comprised of a textile substrate selected from the group consisting of woven material, nonwoven material, knitted material, and combinations thereof. Textile substrates, and nonwoven materials in particular, may have the disadvantage of degenerating over time. The fibers start untangling during the shear stress produced from walking and/or roller traffic on the carpet/carpet tile. However, a textile substrate (such as a nonwoven material or fabric) having adhesive layer 121 applied to its surface has been found to be more resistant to such degeneration and is desirable for use in the present invention. Adhesive layer 121 contains floor facing surface 21a. Adhesive layer 121 is comprised of adhesive material selected from the group consisting of hot melt adhesives (such as polyurethane hotmelt, polyolefin hotmelt, and the like), pressure sensitive adhesives, polyvinyl chloride ("pvc"), acrylic/pvc copolymer, partially chlorinated acrylic polymer, bitumen materials, and the like, and combinations thereof. Pressure sensitive adhesives include emulsions, solutions (also called solvent adhesives), hot melts adhesives, ultraviolet light-cured adhesives, and solids (referring to the amount of non-solvent content in an adhesive by weight). Pressure sensitive adhesives may be selected from rubber-based adhesives, acrylic-based adhesives, modified acrylic adhesives, silicone adhesives, and combinations thereof. In one aspect of the invention, adhesive layer 121 is a pressure sensitive hot melt adhesive. Commercially available pressure sensitive adhesives are available, for example, from Avery Dennison Corporation.

Adhesive layer 121 (also referred to herein as "shear resistant surface") is preferably comprised of a material that is moisture permeable. It is desirable that moisture collected on the flooring surface be allowed to move (or wick) into the floor-facing surface of the floor tile. In one aspect of the invention, the floor-facing surface of the floor tile is a textile substrate (such as a nonwoven material). In another aspect, the floor-facing surface is adhesive layer 121. The floor-facing surface of the floor tile may be considered as a moisture transport layer. The moisture transport feature of the floor tiles of the present invention is advantageous since it is known that moisture often collects on flooring surfaces and can create undesirable mildew and mold issues for the flooring surface and/or the floor tiles. Thus, when the floor tile is able to move moisture from the flooring surface and into the floor tile, the moisture can be eliminated or drastically reduced. Furthermore, the fact that the flooring system is comprised of interconnected floor tiles provides at least one avenue for moisture to escape the flooring surface. This avenue of escape is the space that exists between individual floor tiles. Without being bound by theory, it is believed that moisture is moved from the flooring surface by the moisture transport layer of the floor tile. This is generally a vertical movement of moisture. Once contained in the moisture transport layer, the moisture can move in a generally horizontal direction to the edges of the floor tile where it can escape (e.g. evaporate) through the space between the interconnected tiles.

In one aspect of the invention, tertiary layer 110 is not included in carpet tile of the present invention. In this instance, adhesive layer 121 is added directly to secondary backing layer 119.

Adhesive fastener 140 is a multi-layered composite material shown in FIG. 1 for attaching carpet tiles to one another. Adhesive fastener 140 is attached to a portion of adhesive layer 121 of carpet tile 150. A single carpet tile may contain one adhesive fastener or a plurality of adhesive fasteners. In one aspect of the invention, at least a portion of adhesive layer 121 directly contacts the flooring surface because adhesive fastener 140 does not cover the entire floor-facing surface of adhesive layer 121. Thus, adhesive layer 121 may further be characterized as an adhesive fastener-receiving layer.

FIG. 2 illustrates carpet tile 250 comprised of tufted pile carpet with face yarns 215 having a cut pile construction and primary backing layer 217. Carpet tile 250 is shown further comprised of secondary backing layer 219, tertiary backing layer 210, adhesive layer 221 and adhesive fasteners 240. The components of FIG. 2 are comprised of the same material options as described herein for those of FIG. 1. FIG. 2 illustrates adhesive fastener 240 in an attached (e.g. connected) state. The process of attaching adhesive fastener 240 to adhesive layer 221 includes aligning the desired portion of the fastener with the desired portion of the adhesive layer of the carpet tile and applying sufficient pressure to adhere the adhesive fastener to the adhesive layer.

Secondary backing layers 119, 219 are comprised of adhesive materials that are generally classified as permanent adhesives. Secondary backing layers 119, 219 are comprised of adhesive material selected from the group consisting of water bourne latex-containing materials (such as styrene butadiene, ethylene vinyl acetate, acrylic, and the like), hot melt adhesives (such as polyolefin, polyurethane, polyester, nylon, bitumen, and the like), plastisol adhesives (such as polyvinyl chloride), and the like, and copolymers and/or combinations thereof. In one aspect of the invention, secondary backing layers 119, 219 are selected from water bourne latex-containing materials and hot melt adhesives.

In one aspect of the present invention, the tufted pile carpet is comprised of yarn tufted into fabric, which is then injection or fluid dyed, and then bonded with a rubber layer or washable latex backing. The carpet yarn may be selected from nylon 6; nylon 6,6; polyester; and polypropylene fiber. The yarn is tufted into a woven or nonwoven substrate. The yarn can be of any pile height and weight necessary to support printing. In one aspect of the invention, the tufted pile carpet contains a visual image. The visual image may be a printed image. The tufted pile carpet may be printed using any print process. In one aspect, injection dyeing may be utilized to print the tufted pile carpet.

Printing inks for printing the tufted pile carpet will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthol imide, naphthoquinone imide and methane, triarylmethine and quinoline types.

As is known in the textile printing art, specific dye selection depends upon the type of fiber and/or fibers comprising the washable textile component that is being printed. For example, in general, a disperse dye may be used to print polyester fibers. Alternatively, for materials made from cationic dyeable polyester fiber, cationic dyes may be used.

The printing process may utilize a jet dyeing machine, or a digital printing machine, to place printing ink on the surface of the carpet tile in predetermined locations. One suitable and commercially available digital printing machine is the Millitron® digital printing machine, available from Milliken & Company of Spartanburg, S.C. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, S.C. In one aspect, a tufted carpet made according to the processes disclosed in U.S. Pat. Nos. 7,678,159 and 7,846,214, both to Weiner, may be printed with a jet dyeing apparatus as described and exemplified herein and be used as the tufted carpet substrate of the present invention.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, Mass. Alternatively, polymer viscosity may be measured by using a parallel plate rheometer, such as made by Haake from Rheology Services of Victoria Australia.

It should be noted that the layers of the carpet tile described herein are typically prepared and combined together in larger roll form as a carpet or other floorcovering article, and not initially in smaller carpet tile form. Thus, after assembling the layers of the carpet together, the carpet is then cut into carpet tiles. The carpet tiles may be cut using a computer controlled cutting device, such as a Gerber machine, or by using a mechanical dye cutter. The carpet should be cut with precision such that the carpet tiles fit in place with the surrounding standard carpet tiles. Carpet tiles may be cut into sizes in the range from 4 inches by 4 inches to 72 inches by 72 inches. The carpet tiles may be of the same length and width, thus forming a square shape. Or, the carpet tiles may have different dimensions such that the width and the length are not the same. For example, the carpet tiles may be a rectangular shape. Either before or after cutting, the carpet and/or carpet tiles may be exposed to post treatment steps. For example, chemical treatments such as stain release, stain block, antimicrobial resistance, bleach resistance, and the like, may be added to the textile substrate portion (e.g. the walking surface or non-floor facing surface) of the carpet tiles. Mechanical post treatments may include cutting, shearing, and/or napping the surface of the carpet tiles.

As shown in FIGS. 3 and 4, individual carpet tiles are attached to one another to form a plurality of interconnected carpet tiles via at least one adhesive fastener. FIG. 3 illustrates carpet tile 350 and adhesive fastener 340 attached to one another to form element 300. A portion of adhesive fastener 340 is shown attached to a portion of carpet tile 350. In some instances, portions of the adhesive fastener may be attached to portions of one, two, three, or four different carpet tiles. In one aspect of the invention, a portion of the surface of adhesive fastener 340 is in direct contact with a portion of adhesive layer 321 of carpet tile 350, thereby creating an adhesive-to-adhesive attachment.

Adhesive layers 121, 221, 321 are comprised of adhesive materials that are generally classified as removeable/repositionable. It is further desirable that adhesive layers 121, 221, 321 are comprised of adhesive material having high shear resistance. In one aspect of the invention, adhesive layers 121, 221, 321 are characterized as having high shear resistance and low peel strength (making these layers removeable/repositionable), resulting in adhesive layers which leave no residue on the flooring surface when removed from the flooring surface. In one aspect of the invention, adhesive layers 121, 221, 321 are comprised of hot melt adhesives.

Shear resistance may be provided to the floor tiles of the present invention in several ways. First, as described previously herein, an adhesive layer may be added to the secondary backing layer or to the tertiary layer of the floor tile (such as carpet tile). This method is an example of an additive chemical modification of the floor tile.

Other additive chemical modifications suitable for providing shear resistance to the floor tiles include cohesive materials. Exemplary cohesive materials include natural rubber, such as natural rubber latex-based materials. One commercially available nature rubber latex is 8221 from Cattie Adhesive of Quakertown, Pa. Other suitable materials include polymer or polymer compounds having the following characteristics: (a) they are physically or chemically crosslinked; (b) they contain flexible polymer chains in an amorphous state which can partially infuse into the other cohesive component surface and entangle with the other chains, and/or (c) they have free chain ends to help form an entanglement network. In this regard, styrene-isoprene-styrene elastomer (such as Kraton D1161) or styrene-butadiene-styrene elastomer (such as Kraton D1102) may be a suitable cohesive material. Preferably, these materials contain a high diblock content. Other suitable polymers include polyolefin copolymer elastomer (such as Vistamaxx 6202 from Exxon or Dow Engage from Dow), polyester copolymer elastomer (such as Riteflex 425 from Celanese), and cis-polyisoprene elastomer.

Another method for adding shear resistance to the floor tiles is by mechanically modifying the floor-facing surface of the floor tile. For example, the floor-facing surface of the floor tile may be texturized or otherwise modified by subtractive (e.g. removing portions of the surface) or additive (e.g. adding protrusions to the surface) of the floor-facing surface of the floor tile. The resulting floor tile contains a secondary backing layer having a shear resistant surface thereon or a tertiary layer having a shear resistant surface thereon. In a further aspect, the secondary backing layer or tertiary layer may contain areas of shear resistant surface and areas of non-shear resistant surface. Further, the secondary backing layer or tertiary layer may contain a shear resistant surface on substantially the entire second layer or the entire tertiary layer. In addition, in one aspect of the invention, at least a portion of the shear resistant surface of the secondary backing layer is in direct contact with a flooring surface. Alternatively, at least a portion of the shear resistant surface of the secondary backing layer is in direct contact with a flooring surface.

Note that each floor tile contains a wear layer (or wear surface) and a floor-facing (or floor contacting) surface. The wear layer is generally comprised of polymer-containing material. Polymer-containing material includes thermoplastic materials as previously described herein. The polymer-containing material may be in the form of fiber, yarn, film, or combinations thereof. When individual floor tiles are combined together with the adhesive fasteners of the present invention, they form a plurality of interconnected floor tiles. The plurality of interconnected floor tiles contains direct physical contact between at least a portion of the adhesive fastener and the shear resistant surface of the second layer or of the tertiary layer.

FIG. 4 illustrates a plurality of interconnected carpet tiles 4000 joined together via the adhesive system of the present invention. The plurality of interconnected carpet tiles 4000 is comprised of individual carpet tiles 450 connected to one another via at least one adhesive fastener 440. In one aspect of the invention, the plurality of interconnected carpet tiles 4000 is free from polyvinyl chloride (i.e. is "pvc-free").

The multi-layered composite structure of the adhesive fastener of the present invention is shown in greater detail in FIGS. 5A, 5B and 5C. FIG. 5A illustrates adhesive fastener 540 comprised of film layer 502 and adhesive layer 501. Film layer 502 is typically a polymer film. In one aspect of the invention, the polymer film is comprised of a thermoplastic material as herein previously described. The polymer film may be an extruded polymer film. Adhesive layer 501 is comprised of material selected from the group consisting of hot melt adhesives (such as polyurethane hotmelt, polyolefin hotmelt, and the like), pressure sensitive adhesives, polyvinyl chloride ("pvc"), acrylic/pvc copolymer, partially chlorinated acrylic polymer, bitumen materials, and the like, and combinations thereof. Pressure sensitive adhesives include emulsions, solutions (also called solvent adhesives), hot melts adhesives, ultraviolet light-cured adhesives, and solids (referring to the amount of non-solvent content in an adhesive by weight). Pressure sensitive adhesives may be selected from rubber-based adhesives, acrylic-based adhesives, modified acrylic adhesives, silicone adhesives, and combinations thereof. In one aspect of the invention, adhesive layer 501 is a waterborne or solvent borne applied acrylic adhesive. In a further aspect of the invention, adhesive layer 501 is a waterborne applied acrylic adhesive. Commercially available pressure sensitive adhesives are available, for example, from Avery Dennison Corporation.

Adhesive layer 501 is the surface of adhesive fastener 540 intended for direct attachment to a floor tile (e.g. a carpet tile and/or a vinyl tile). Film layer 502 is the surface of adhesive fastener 540 intended for direct contact with a flooring surface.

FIG. 5B illustrates adhesive fastener 540 comprised of textile substrate layer 504 and adhesive layer 501. Textile substrate layer 504 is a textile substrate comprised of materials as herein previously described. In one aspect of the invention, textile substrate layer 504 is comprised of 100% spunbonded polyethylene fiber in a nonwoven construction. A commercially available example of textile substrate 504 is Tyvek® nonwoven from Dupont. Adhesive layer 501 is comprised of the same adhesive materials as described in FIG. 5A. Adhesive layer 501 is the surface of adhesive fastener 540 intended for direct attachment to a floor tile (e.g. a carpet tile and/or a vinyl tile). Textile substrate layer 504 is the surface of adhesive fastener 540 intended for direct contact with a flooring surface.

FIG. 5C illustrates adhesive fastener 540 comprised of textile substrate layer 504, adhesive layer 501", textile substrate layer 506, and adhesive layer 501'. Textile substrate layers 504, 506 are independently selected from any of the afore-mentioned materials comprising textile substrates. Adhesive layers 501", 501' are independently selected from any of the afore-mentioned adhesive materials comprising the adhesive layer as herein previously described. In one aspect of the invention, textile substrate layer 504 is a nonwoven textile substrate and textile substrate layer 506 is a woven textile substrate. Adhesive layer 501' is the surface of adhesive fastener 540 intended for direct attachment to a floor tile (e.g. a carpet tile and/or a vinyl tile). Textile substrate layer 504 is the surface of adhesive fastener 540 intended for direct contact with a flooring surface. Adhesive layer 501' is further characterized as being a removeable/repositionable adhesive. In contrast, adhesive layer 501" is characterized as being a permanent adhesive.

In one aspect of the invention, any adhesive layer that is sandwiched between two other layers of material is generally characterized as being a permanent adhesive. Further, any adhesive layer that is not sandwiched between two other layers of material is generally characterized as being a removeable/repositionable adhesive.

In an alternative aspect of the invention, the floor tiles (e.g. carpet tiles, vinyl tiles, or luxury vinyl tiles) may be attached to one another by mechanical fasteners. Mechanical fasteners may include, for example, Velcro® fastening systems, mushroom-type fastening systems, grommets, rivets, pins (such as barbed pins and/or flared pins), plastic rivets, hooks, spring loaded snaps, snaps that require special tools to release them to aid in the prevention of theft and inadvertent release, and the like, and combinations thereof.

One example of mechanical fasteners include a mushroom-type fastener system. The system includes a mushroom-type fastener strip characterized by a backing, an array of upstanding stems (or protrusions) distributed across the face of the backing, with each of the stems having a mushroom-shaped head. The mushroom-type fastener strips are typically provided as an integrally molded unit. A mushroom-type fastener strip can engage the fibers contained in a textile substrate to form an interlocking adhesive system for connecting one floor tile to an adjacent floor tile. Examples of suitable mushroom-type fastener systems may be found in the following references: U.S. Pat. Nos. 4,454,183; 5,077,870; 5,607,635; 5,845,735; 7,188,396 B2; and US Published Patent Application No. 2014/0137377 A1. Commercial products include Microplast® and Duotec® fasteners, available from Gottlieb Binder GmbH & Co. KG, Dual Lock™ fasteners from 3M, and Aplix® 745 from Aplix, Inc.

Mechanical fasteners, such as mushroom-type hook fasteners, suitable for use in the present invention allow floor tiles to be easily disconnected and/or unattached from one another. For example, if a tile becomes damaged or otherwise no longer aesthetically pleasing it can be manually removed by simply pulling the tile up until it is released from the mechanical fastener(s). A new floor tile can then be installed in its place by using light pressure to attach it to the existing mechanical fastener. Thus, the invention described herein for attaching floor tiles to one another may be characterized as being a releasably attachable adhesive system for floor tiles. It should also be noted that it is not necessary for the entire surface of the floor tile to be covered with the mechanical fastener (e.g. mushroom-type fastener system). Rather, for economy of manufacture and to balance the requirements of stabilizing the floor tiles without making it overly difficult to remove one or more tiles for cleaning or replacement, the mushroom-type hook fastener system may be spaced apart in discrete areas, for example spaced around the edges or corners of the floor tile.

It should be understood that the construction of the carpet tile described herein is not limited only to that which is shown by the Figures. For example, additional layers of substrate may be included in the carpet tile. In one aspect, one or more layers of glass fiber, foam (such as polyurethane foam), additional textile substrate and additional permanent adhesive may be included in the carpet tile. Exemplary carpet tile constructions illustrating one or more of these additional layers may be found in commonly owned U.S. Pat. No. 7,182,989 to Higgins et al. and US Pat. Pub. No. 2014/0212618 to McBride et al.

Turning now to yet a further embodiment of the present invention, FIGS. 6 to 9 illustrate various forms of vinyl tile which may be interconnected to one another via the adhesive system of the present invention. FIGS. 6 to 9 are representative examples of multi-layered vinyl floor tile also known as a luxury vinyl tile (or "LVT"). FIG. 6 illustrates vinyl tile 600 comprised of seven sequential layers that include polyurethane coating 610, transparent wear layer 620, printed layer 630, vinyl core layer 650, vinyl backing layer 660, adhesive layer 670, and textile substrate layer 690. In one aspect of the invention, transparent wear layer 620 may be comprised of a vinyl-containing material. Adhesive layer 670 may also be comprised of a vinyl-containing adhesive material. In another aspect of the invention, textile substrate layer 690 is a nonwoven textile substrate and is comprised of polyester fiber, polypropylene fiber or blends of polyester and polypropylene fibers. The adhesive system of the present invention is illustrated as adhesive fastener 640. Adhesive fastener 640 is comprised of adhesive materials as described further herein. Adhesive fastener 640 is positioned and attached to vinyl tile 600 as similarly described herein for attaching adhesive fasteners to carpet floor tiles. A plurality of vinyl tiles may be attached to one another via the adhesive fastener of the present invention. In one aspect of the invention, a plurality of vinyl tiles are attached to one another via the adhesive system of the present invention to form a floating floorcovering article. In another aspect of the invention, additional adhesive material is utilized with the adhesive system of the present invention to form a non-floating floorcovering article comprised of a plurality of vinyl tiles attached to one another via adhesive fasteners as described herein.

FIG. 7 illustrates vinyl tile 700 comprised of eight sequential layers that include polyurethane coating 710, transparent wear layer 720, printed layer 730, vinyl core layer 750, vinyl backing layer 760, adhesive layer 770, foam layer 780, and textile substrate layer 790. In one aspect of the invention, transparent wear layer 720 may be comprised of a vinyl-containing material. Adhesive layer 770 may also be comprised of a vinyl-containing adhesive material. Foam layer 780 is an open cell or closed cell foam material. Foam layer 780 may be a polyurethane foam, a foamed vinyl material, or a foamed layer comprised of other suitable polymer materials known for use as foam articles. In another aspect of the invention, textile substrate layer 790 is a nonwoven textile substrate and is comprised of polyester fiber, polypropylene fiber or blends of polyester and polypropylene fibers. The adhesive system of the present invention is illustrated as adhesive fastener 740. Adhesive fastener 740 is comprised of adhesive materials as described further herein. Adhesive fastener 740 is positioned and attached to vinyl tile 700 as similarly described herein for attaching adhesive fasteners to carpet floor tiles.

FIG. 8 illustrates vinyl tile 800 comprised of eight sequential layers that include polyurethane coating 810, transparent wear layer 820, printed layer 830, vinyl core layer 850, glass fiber layer 855, vinyl backing layer 860, adhesive layer 870, and textile substrate layer 890. In one aspect of the invention, transparent wear layer 820 may be comprised of a vinyl-containing material. Adhesive layer 870 may also be comprised of a vinyl-containing adhesive material. In another aspect of the invention, textile substrate layer 890 is a nonwoven textile substrate and is comprised of polyester fiber, polypropylene fiber or blends of polyester and polypropylene fibers. The adhesive system of the present invention is illustrated as adhesive fastener 840. Adhesive fastener 840 is comprised of adhesive materials as described further herein. Adhesive fastener 840 is positioned and attached to vinyl tile 800 as similarly described herein for attaching adhesive fasteners to carpet floor tiles.

FIG. 9 illustrates vinyl tile 900 comprised of nine sequential layers that include polyurethane coating 910, transparent wear layer 920, printed layer 930, vinyl core layer 950, glass fiber layer 955, vinyl backing layer 960, adhesive layer 970, foam layer 980, and textile substrate layer 990. In one aspect of the invention, transparent wear layer 920 may be comprised of a vinyl-containing material. Adhesive layer 970 may also be comprised of a vinyl-containing adhesive material. Foam layer 980 is an open cell or closed cell foam material. Foam layer 980 may be a polyurethane foam, a foamed vinyl material, or a foamed layer comprised of other suitable polymer materials known for use as foam articles. In another aspect of the invention, textile substrate layer 990 is a nonwoven textile substrate and is comprised of polyester fiber, polypropylene fiber or blends of polyester and polypropylene fibers. The adhesive system of the present invention is illustrated as adhesive fastener 940. Adhesive fastener 940 is comprised of adhesive materials as described further herein. Adhesive fastener 940 is positioned and attached to vinyl tile 900 as similarly described herein for attaching adhesive fasteners to carpet floor tiles.

As shown in FIG. 10, individual vinyl tiles are attached to one another to form a plurality of interconnected vinyl tiles via at least one adhesive fastener. FIG. 10 illustrates a plurality of interconnected vinyl tiles 1000 joined together via the adhesive system of the present invention. The plurality of interconnected vinyl tiles 1000 is comprised of individual vinyl tiles 50 connected to one another via at least one adhesive fastener 40. A portion of adhesive fastener 40 is shown attached to a portion of vinyl tile 50. In some instances, portions of the adhesive fastener may be attached to portions of one, two, three, or four different vinyl tiles. In one aspect of the invention, the plurality of interconnected vinyl tiles 1000 is free from polyvinyl chloride (i.e. is "pvc-free").

It should be noted that the layers of the vinyl article described herein (e.g. as described in FIGS. 6 to 10) are typically prepared and combined together in larger roll form, and not initially in smaller tile form. Thus, after assembling the layers of the vinyl article together, the article is then cut into vinyl tiles. The vinyl article may be cut using a computer controlled cutting device, such as a Gerber machine, or by using a mechanical dye cutter. The vinyl article should be cut with precision such that the resulting cut tiles fit in place with the surrounding cut tiles. The vinyl article may be cut into vinyl tiles having sizes in the range from 4 inches by 4 inches to 72 inches by 72 inches. The vinyl tiles may be of the same length and width, thus forming a square shape. Or, the vinyl tiles may have different dimensions such that the width and the length are not the same. For example, the vinyl tiles may be a rectangular shape.

It should be understood that the construction of the vinyl tile described herein is not limited only to that which is shown by the Figures. Additional layers of substrate may be included in the vinyl tile. For example, a removeable/repositionable adhesive may be included on the floor facing surface of the vinyl tile. Alternatively, one or more layers of substrate may be removed from the vinyl tile and still be within the scope of the present invention.

For instance, in one aspect of the invention, a flooring system comprises: (a) a plurality of vinyl-containing floor tiles, wherein the plurality of vinyl-containing floor tiles contains individual vinyl-containing floor tiles, and wherein the individual vinyl-containing floor tiles are comprised of: (i) a first wear layer and (ii) a second layer having a shear resistant surface thereon; and (b) at least one adhesive fastener containing an adhesive material, wherein at least a portion of the adhesive fastener is attached to at least a portion of the shear resistant surface of the individual floor tiles to form a plurality of floor tiles interconnected to one another via the at least one adhesive fastener.

In another aspect of the invention, a flooring system comprises: (a) a plurality of vinyl-containing floor tiles, wherein the plurality of vinyl-containing floor tiles contains individual vinyl-containing floor tiles, and wherein the individual vinyl-containing floor tiles are comprised of: (i) a first wear layer, (ii) a second layer, and (iii) a third layer having a shear resistant surface thereon; and (b) at least one adhesive fastener containing an adhesive material; wherein at least a portion of the adhesive fastener is attached to at least a portion of the shear resistant surface of the individual floor tiles to form a plurality of floor tiles interconnected to one another via the at least one adhesive fastener.

EXAMPLES

Several test methods for evaluating the performance of textile substrates (such as carpet and/or floor mats) are herein described.

The performance requirements for commercial and/or residential carpet tile include a mixture of well documented standards and industry known tests. Tuft Bind of Pile Yarn Floor Coverings (ASTM D1335) and the Aachen Dimensional Stability Test (ISO 2551) are performance tests referenced by several organizations (e.g. General Services Administration). Achieving tuft bind values greater than 4 pounds is desirable, and greater than 5 pounds even more desirable. With respect to the Aachen (ISO 2551) performance test, dimensional stability of less than +/−0.1% change may be most preferred.

Pilling and fuzzing resistance for loop pile (ITTS112) is a performance test known to the industry and those practiced in the art. The pilling and fuzzing resistance test is typically a predictor of how quickly the carpet (or textile substrate) will pill, fuzz and prematurely age over time. The test uses a small roller covered with the hook part of a hook and loop fastener. The hook material is Hook 88 from Velcro of Manchester, N.H. and the roller weight is 2 pounds. The hook-covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

Example 1

Adhesive materials were evaluated for their ability to be repositioned/removeable thereby determining their suitability as adhesive materials for the present invention. The adhesive interface between several different layers of floor tiles as described previously herein were tested.

In part A, two-inch wide strips of carpet tile as illustrated in FIG. 1 was pressed onto a commercial vinyl tile in both 90 degree peel and lap shear orientations as specified in ASTM D6862 ("Standard Test Method for 90 Degree Peel Resistance of Adhesives") and ASTM D3163 ("Standard Test Method for Determining Strength of Adhesively Bonded Rigid Plastic-Lap Shear Joints in Shear by Tension Loading"). The strain rate was 1 inch/minute. In part B, three different two-inch wide adhesive strips as shown in FIG. 5C were pressed onto the carpet tile illustrated in FIG. 1, and the peel and shear tests were repeated. The test results are shown in Table 1.

TABLE 1

Peel and Shear Testing of Adhesive-Containing Layers of Floor Tiles

| Part | Interface | 90° Peel, Avg gf/cm | Observation - 90° Peel | Peak Lap Shear, gf/cm2 | Observation - Lap shear |
|---|---|---|---|---|---|
| A | Adhesive 121, hot melt - Vinyl floor tile | NA | Peel strength less than sensitivity of equipment; | 51.5 | Fracture at interface between adhesive and |

TABLE 1-continued

Peel and Shear Testing of Adhesive-Containing Layers of Floor Tiles

| Part | Interface | 90° Peel, Avg gf/cm | Observation - 90° Peel | Peak Lap Shear, gf/cm2 | Observation - Lap shear |
|------|-----------|---------------------|------------------------|------------------------|-------------------------|
| | | | repositionable | | vinyl floor tile; repositionable |
| B1 | Adhesive 121, hot melt - Adhesive 501, acrylic, 9 mil, on film layer 502 | 115.0 | Fracture between nonwoven and PU foam; not repositionable; bond between adhesives is stronger than strength of PU layer 119 | 569.6 | Adhesive 501', Brand 1 pulls fibers from tertiary backing layer 110 |
| B2 | Adhesive 121, hot melt - Adhesive 501, acrylic, 3 mil, on film layer 502 | 1.5 | Fracture at interface between adhesives; repositionable | 37.5 | Fracture at interface between adhesives |
| B3 | Adhesive 121, hot melt - Adhesive 501', acrylic, 5 mil, on textile substrate layer 506 | 57.0 | Fracture at interface between adhesives; repositionable | 471.1 | Adhesive 501', Brand 2 pulls fibers from tertiary backing layer 110 |

As shown in B1, the repositionable characteristic of the pressure sensitive adhesive bond was lost if the peel bond strength was too great. In B2, the thin, low strength adhesive did not produce high levels of shear strength. In B3, a balance of low peel strength and high shear strength was found.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A flooring system comprising:
   (a) a plurality of floor tiles, wherein the plurality of floor tiles contains individual floor tiles, and wherein the individual floor tiles are comprised of: (i) a first wear layer (125), (ii) a second layer (119), and (iii) a third layer (110) having a shear resistant surface thereon (121); and
   (b) at least one adhesive fastener (140) containing an adhesive material;
   wherein at least a portion of the adhesive fastener (140) is attached to at least a portion of the shear resistant surface (121) of the individual floor tiles to form a plurality of floor tiles interconnected to one another via the at least one adhesive fastener.

2. The flooring system of claim 1, wherein the first wear layer is comprised of tufted pile carpet.

3. The flooring system of claim 1, wherein the third layer is comprised of a textile substrate.

4. The flooring system of claim 3, wherein the textile substrate is comprised of a nonwoven material.

5. The flooring system of claim 1, wherein the third layer is comprised of a single layer of textile substrate.

6. The flooring system of claim 1, wherein the third layer is a multi-component laminate.

7. The flooring system of claim 6, wherein the multi-component laminate is comprised of a layer of textile substrate and a layer of foam.

8. The flooring system of claim 7, wherein the foam is a polyurethane foam.

9. The flooring system of claim 1, wherein the first wear layer is comprised of vinyl-containing material.

10. The flooring system of claim 9, wherein the third layer is comprised of a textile substrate.

11. The flooring system of claim 10, wherein the textile substrate is comprised of a nonwoven material.

12. The flooring system of claim 9, wherein the third layer is comprised of a single layer of textile substrate.

13. The flooring system of claim 9, wherein the third layer is a multi-component laminate.

14. The flooring system of claim 13, wherein the multi-component laminate is comprised of a layer of textile substrate and layer of foam.

15. The flooring system of claim 14, wherein the foam is a polyurethane foam.

16. A flooring system comprising:
(a) a plurality of floor tiles, wherein the plurality of floor tiles contains individual floor tiles, and wherein the individual floor tiles are comprised of: (i) a first wear layer (125), (ii) a second layer (119), and (iii) a third layer (110) having an adhesive layer thereon (121); and
(b) at least one adhesive fastener (140) containing an adhesive material;
wherein at least a portion of the adhesive fastener (140) is attached to at least a portion of the adhesive layer (121) of the individual floor tiles to form a plurality of floor tiles interconnected to one another via the at least one adhesive fastener.

17. A flooring system comprising:
(a) a plurality of floor tiles, wherein the plurality of floor tiles contains individual floor tiles, and wherein the individual floor tiles are comprised of: (i) a first wear layer (125), (ii) a second layer (119), and (iii) a third layer (110) comprised of a textile substrate or a multi-component laminate; and
(b) at least one adhesive fastener (140) containing an adhesive material;
wherein at least a portion of the adhesive fastener (140) is attached to at least a portion of the third layer (110) or multi-component laminate of the individual floor tiles to form a plurality of floor tiles interconnected to one another via the at least one adhesive fastener.

18. A flooring system for carpet tile comprising:
(a) a plurality of carpet tiles, wherein the plurality of carpet tiles contains individual carpet tiles, and wherein the individual carpet tiles are comprised of: (i) a first layer of tufted pile carpet, (ii) a second layer of back coating, and (iii) a third layer of textile substrate; and
(b) at least one adhesive fastener;
wherein at least a portion of the adhesive fastener is attached to at least a portion of the third layer of textile substrate of the individual carpet tiles to form a plurality of carpet tiles interconnected to one another via the at least one adhesive fastener.

19. A flooring system comprising:
(a) a plurality of floor tiles, wherein the plurality of floor tiles contains individual floor tiles, and wherein the individual floor tiles are comprised of: (i) a first wear layer, (ii) a second layer of back coating, and (iii) a third layer of textile substrate having an adhesive coating thereon; and
(b) at least one adhesive fastener containing an adhesive material, wherein the adhesive fastener may be comprised of the same or different adhesive material as the third layer of textile substrate;
wherein at least a portion of the adhesive fastener is attached to at least a portion of the textile substrate of the individual floor tiles to form a plurality of floor tiles interconnected to one another via the at least one adhesive fastener.

* * * * *